United States Patent [19]

Jarsen

[11] 4,358,802
[45] Nov. 9, 1982

[54] FLUID CUSHION TURNTABLE FOR VIDEO DISC PLAYER

[75] Inventor: Manfred H. Jarsen, Encino, Calif.

[73] Assignee: MCA Disco-Vision, Inc., Universal City, Calif.

[21] Appl. No.: 402,634

[22] Filed: Oct. 1, 1973

[51] Int. Cl.² .................. G11B 5/016; G11B 17/32
[52] U.S. Cl. ...................................... 360/99; 360/102
[58] Field of Search .............. 360/99, 102, 103, 86, 360/97, 98, 135; 274/39 A

[56] References Cited

U.S. PATENT DOCUMENTS

| 3,153,241 | 10/1964 | Ramrath et al. | 360/99 |
| 3,603,742 | 9/1971 | Schuller | 360/102 |
| 3,688,285 | 8/1972 | Lawrence et al. | 360/99 |
| 3,729,720 | 4/1973 | Darling et al. | 360/99 |

*Primary Examiner*—Robert S. Tupper
*Attorney, Agent, or Firm*—Ronald J. Clark

[57] ABSTRACT

A player for video discs includes an improved rotating turntable to provide a fluid cushion bearing to support a thin, flexible video disc. The turntable includes apertures which direct an air flow between the disc and the turntable surface and the flow of air acts as a hydrodynamic bearing.

11 Claims, 6 Drawing Figures

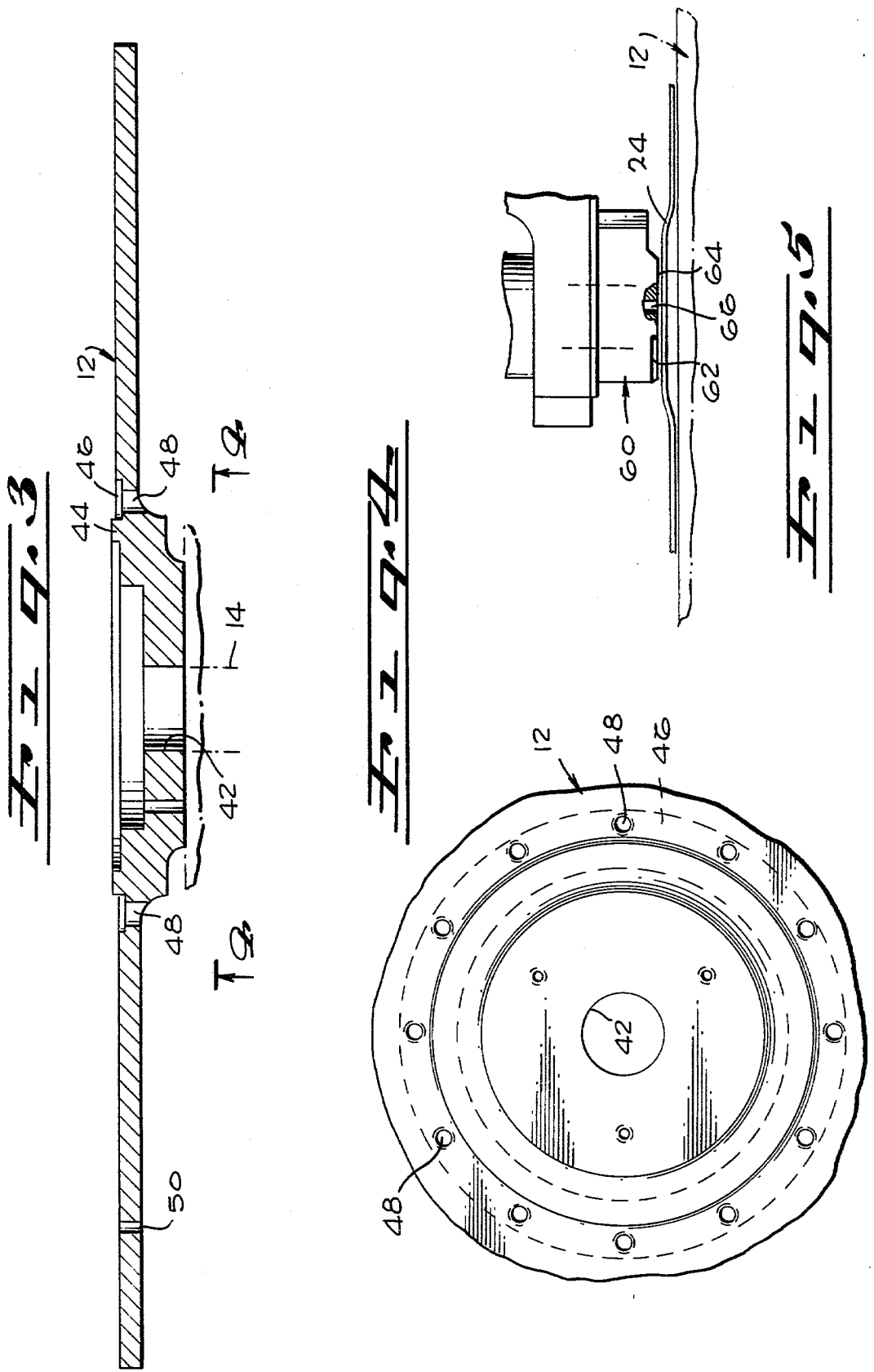

FLUID CUSHION TURNTABLE FOR VIDEO DISC PLAYER

RELATED PATENT APPLICATIONS AND PATENTS

"Articulated Mirror" by James E. Elliott, Ser. No. 333,559, filed Feb. 20, 1973, now U.S. Pat. No. 3,894,410; "Video Disc Mastering System" by John S. Winslow, Ser. No. 333,560, filed Feb. 20, 1973, now abandoned; "Reading Head for Video Disc Player" by Manfred H. Jarsen, Ser. No. 402,635, filed Oct. 1, 1973, now U.S. Pat. No. 3,947,888; "Video Disc Player" by James E. Elliott, Ser. No. 314,082, filed Dec. 11, 1972, now U.S. Pat. No. 3,914,541; "Video Disc Player" by James E. Elliott, Ser. No. 299,893, filed Oct. 24, 1972, now U.S. Pat. No. 3,829,622; "Video Recording and Reproducing System" by Kent D. Broadbent, Ser. No. 299,892, filed Oct. 24, 1972, now U.S. Pat. No. 3,924,062; "Drop-Out Compensator" by Wayne Ray Dakin, Ser. No. 299,891, filed Oct. 24, 1972, now U.S. Pat. No. 4,091,425; "Video Record Disc and Process for Making Same" by David P. Gregg, Ser. No. 735,007, filed Jan. 27, 1969, now abandoned; "Duplicating Process for Video Disc Records" by Kent D. Broadbent, U.S. Pat. No. 3,658,954, issued Apr. 25, 1972; "Video Signal Transducer Having Servo Controlled Flexible Fiber Optic Track Centering" by David P. Gregg and Keith O. Johnson, U.S. Pat. No. 3,530,258, issued Sept. 22, 1970; "Transparent Recording Disc" by David P. Gregg, U.S. Pat. No. 3,430,966, issued Mar. 4, 1969; "Photoelectric Transducer Head" by David P. Gregg, U.S. Pat. No. 3,349,273, issued Oct. 24, 1967; "Video Disc Playback Assembly" by Keith O. Johnson, U.S. Pat. No. 3,518,442, issued June 30, 1970; "Duplicating Process for Video Disc Records" by Kent D. Broadbent, U.S. Pat. No. 3,687,664, issued Aug. 29, 1972.

BACKGROUND OF THE INVENTION

1. Field of the Invention

This invention relates to information retieval apparatus and, more particularly, to an improved turntable for a video disc player.

2. Description of the Prior Art

It has been known that color video programs can be stored on magnetic tape for subsequent playback, utilizing appropriate video tape reading apparatus. It has also been disclosed that the same information can be recorded on a disc, either through photographic or other processes which achieve a physical deformation of the disc in a predetermined pattern, which can then optically "read" to recover a video signal suitable for application to a standard TV receiver.

In the teachings of the prior art, and especially the patents to Gregg and Johnson and the application of Elliott, supra, apparatus has been disclosed which is adapted to cooperate with the video disc disclosed by Gregg, Johnson, Broadbent, et al, supra. Continued experimentation has led to the development of video disc having a surface upon which information is stored as "holes" or depressions in a surface.

Alternatively, the surface can be altered to provide "bumps" rather than holes representing the stored information. In the following discussion, the term "hole" may be considered to include "bumps" as well.

On a typical video disc, a given hole may be approximately 1 micron in width. A plurality of such holes of varying lengths are placed in a more or less continuous track on a surface of a disc. The disc is adapted to rotate at approximately 1800 rpm for playback. In alternate configurations, the disc may either have a continuous spiral track containing information or may include a plurality of discrete, circular tracks. In either embodiment, a track-to-track spacing of approximately 2 microns is maintained. At such rotational speeds, approximately twenty (20) minutes of program can be accommodated on a 12" diameter disc.

In order to provide a commercially successful system, several requirements must be simultaneously satisfied. The video disc which contains the program material must be easily mass produced, able to take a certain amount of handling and must function on a playback instrument which must be reasonable in cost and sufficiently simple and rugged so that it might function in the environment of a home.

Techniques are available to mass produce discs using techniques which are analogous to those employed in the phonograph record industry. It has been determined that a video disc can be made of thin material without substantial lateral rigidity. Such a disc can accept information in a "hole-no-hole" pattern which can be optically recognized by suitable playback equipment.

The flexibility of the thin plastic disc imposes certain requirements on the playback equipment. Because of the microscopic size of the tracks and the information recorded therein, an optical system must be provided which can discriminate between the presence or absence of a "hole" 1 micron wide in a series of similar "holes". The series of holes of interest is separated from an adjacent series of holes or track by approximately 1 micron, since the distance between the centers of adjacent tracks is in the preferred embodiment approximately 2 microns.

Sufficient energy must be applied to and recovered from the surface to distinguish between the surface states that represent information, and to provide an error signal which enables a control system to maintain the transducer in alignment with the track of interest in an environment of shocks and vibration.

In order to resolve, optically, a spot that is 1 micron in width, the distance between the object plane and the optical system should be held constant to within approximately a micron. If now the surface of the disc cannot be held planar within a mircon, it is necessary to provide some mechanism that will preserve the spacing between the disc surface and a predetermined point in the optical system.

In the prior art, utilizing a substantially rigid disc, a reading head assembly had been disclosed which included a hydrodynamic or fluid bearing which, in conjunction with a mechanical force biasing the head towards the disc surface, maintained the head at a fixed distance from the disc with acceptable accuracy. With a nonrigid, flexible disc, it is necessary first to define the object plane in which the information track is found and then to provide a mechanism that maintains the spacing between that object plane and the optical system.

SUMMARY OF THE INVENTION

An improved playback system has been developed for reproducing video information from a flexible video disc. This improved system includes a turntable which provides a hydrodynamic fluid bearing which affords a noncontact support for the entire disc and an improved reading head which utilizes a negative pressure differential in the vicinity of the head.

The head may be considered substantially "rigid" and the disc may be deemed "compliant" is maintaining a predetermined spacing between the disc surface and the head. A fluid pressure system is responsive to the relative radial location of the playing arm to vary the pressure differential with radial location thereby maintaining a constant head-to-disc spacing independent of relative surface speeds.

The turntable of the present invention also may be utilized with the hydrodynamic bearing heads of the prior art, if a relatively thin disc is employed. It has been found that the plastic, through use, attracts dust particles which may be trapped between the turntable and the disc and which may cause bumps and irregularities on the surface to be read.

The turntable of the present invention maintins a spacing between the disc and turntable surface, avoiding the problem of "trapped" particles. Further, the air flow which creates the cushion has a substantial outward radial component, which, together with the centrifugal forces developed by the rotating disc tends to sweep any particles out from between the disc and turntable.

The novel features which are believed to be characteristic of the invention, both as to organization and method of operation together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 3 is a side-section view of the turntable of the present invention;

FIG. 4 is a bottom view of the turntable of FIG. 3 taken along the line 4—4 in the direction of the appended arrows; and FIG. 5 is a side view of a vacuum head and a flexible disc in operational proximity.

FIG. 6 is a side-section of the turntable of the present invention.

In FIGS. 1 and 2, the turntable portion of a video disc player assembly 10 is shown. While many structural elements are illustrated, it is believed that a detailed, piece-by-piece description of the structure is not necessary to an overall understanding of the present invention. Accordingly, although detail is shown, the descriptions will be more general.

Figure 1:
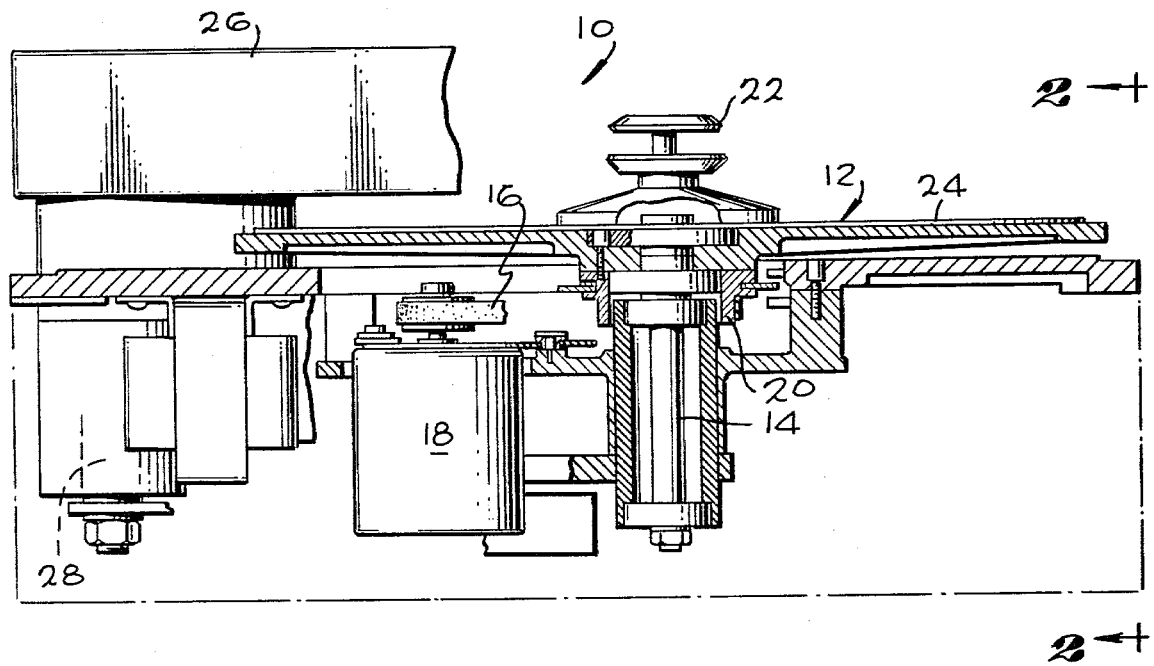
FIG. 1 is a side-section view of a portion of a video disc player mechanism showing the turntable of the present invention.

The turntable 12 is mounted on a spindle 14 mounted in suitable bushings and bearings to enable the turntable 12 to rotate at its preferred speed of approximately 1800 rpm. A drive belt 16 couples a motor 18 to a suitable drive pulley 20 which is an integral part of the turntable 12. A spindle clamp 22 mounts on the turntable 12 and is adapted to constrain a video disc 24 in place and to prevent its movement relative to the turntable 12.

Figure 2:
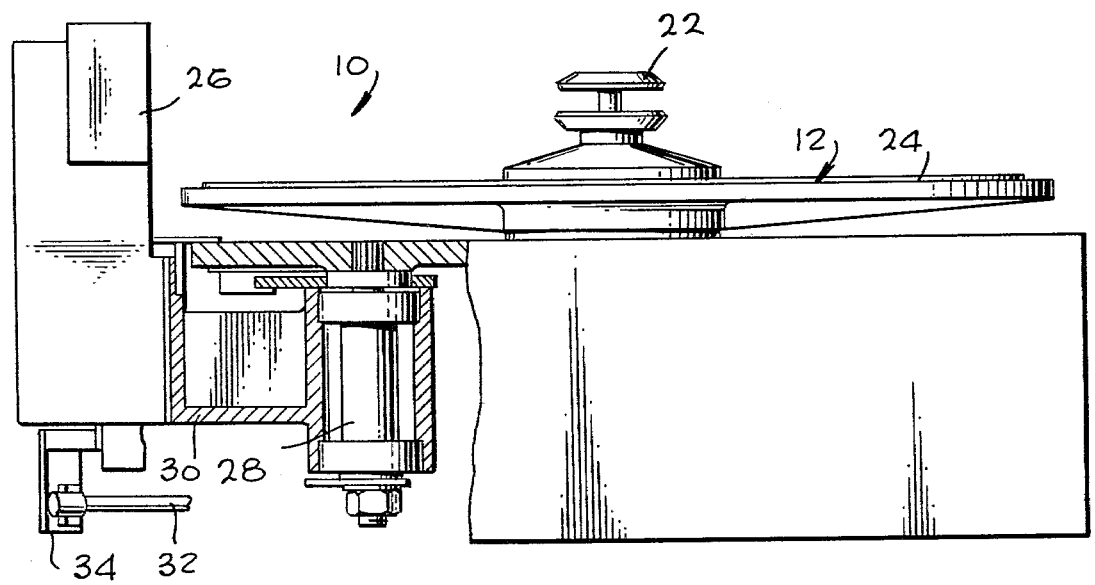
FIG. 2 is an end-section view of the player of FIG. 1 taken along the line 2—2 in the direction of the appended arrows.
Figure 9:
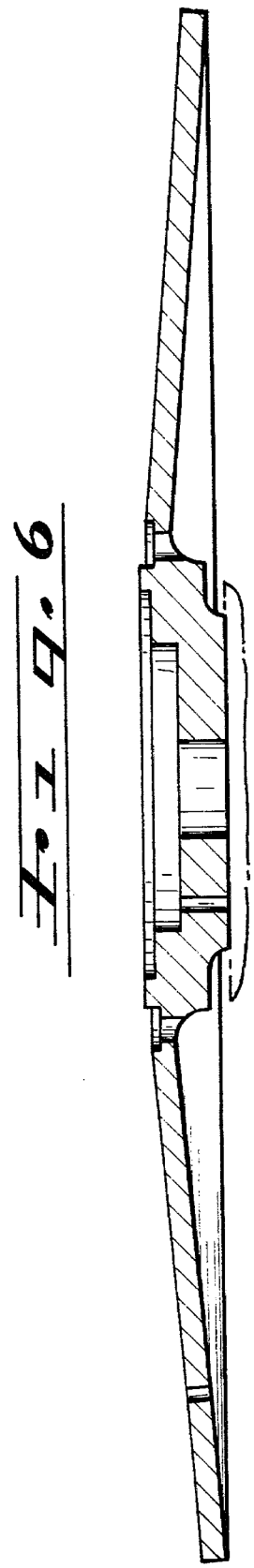

In FIG. 2, there can be seen, in slightly greater detail, the attachment of a player arm 26 to the player 10. A shaft 28 is mounted on the player, and the player arm 26 is attached to the shaft 28 through a suitable elongated collar 30 from which the player arm 26 is cantilevered. As shown, a lead screw 32 is shown pivotally mounted to a depending bracket 34 extending from the base of the arm 26.

As the lead screw 32 is acted upon by a transmission assembly 34, (not shown) the arm assembly 26 is caused to rotate about its shaft 28, and a reading head, carried thereby translates relative to the disc 24 surface, in a substantially radial direction.

FIGS. 3 and 4 illustrate the turntable 12 which includes a central opening 42 which is adapted to receive the spindle 14 illustrated in FIGS. 1 and 2, above. A central land or shoulder 44 is provided about the inner area which supports the center portion of the video disc 24 when it is clamped in place on the spindle 14.

An annular groove 46 is placed on the surface of the turntable 12 and is outwardly displaced from the land or shoulder 44. Orifices 48 connect the groove 46 to the opposite side of the turntable 12 and acts as a conduit to supply air into the groove 46.

Depending upon the mass of the disc 24 and the characteristics of the turntable 12 at its normal rotational speed of 1800 rpm, additional, secondary orifices 50 can be located at more remote radial locations of the turntable 12, to provide an additional air supply into the area between the turntable 12 and the disc 24.

Rotation of the turntable 12 and normal hydrodynamic forces causes a flow of fluid or air through the orifices 48, 50 and between the turntable 12 and the disc 24. The air flow is directed to the outer periphery of the turntable 12. The flow is adequate to provide a fluid cushion under the disc 24 which can support the disc against its own weight and acts to "sweep" out particulate matter which may be found between the disc 24 and the surface of the turntable 12.

For illustrative purposes only, FIG. 5 shows in somewhat idealized form and enlarged, but not to scale, the manner in which a vacuum head 60, the disc 24 and the turntable 12 cooperate to maintain a constant, predetermined spacing between the head 60 and the surface of the disc 24. The head 60 has on the surface adjacent the disc 24, a hydrodynamic bearing step portion 62 and a substantially planar sole plate portion 64. Orifices 66 in the sole plate portion 64 communicate with a vacuum system to reduce the pressure under the sole plate portion 64.

Based upon the optical parameters of the system, it is desirable that the surface of the disc 24 be at a fixed and predetermined distance from the surface of the sole plate portion 64 for optimum resolution of the illuminating spot.

As the turntable 12 revolves, an air cushion is created between the surface of the turntable 12 and the disc 24. At the same time, a vacuum chamber within the head 60 is connected to a vacuum system which evacuates the chamber and creates a negative pressure differential relative to the surface of the video disc 24 and partially defects the hydrodynamic bearing created by the step portion 62.

Accordingly, as an incremental area of the disc 24 comes into proximity with the head 60, the negative pressure differential causes the disc 24 to be locally deformed from its normally planar shape. The relatively higher air pressure supporting the disc 24 on the turntable 12 and the relatively lower pressure in the vicinity of the sole plate 64 causes the disc 24 to approach the sole plate 64 as shown. The magnitude of the vacuum within the chamber determines the spacing between the disc 24 and the sole plate 64.

With other head configurations, and, with contact as well as noncontact transducing schemes, a relatively flexible disc is employed. The air cushion provided by the turntable of the present invention furnishes an improved support for the disc. This improved support is not affected by dust or other particulate matter trapped between the disc and the turntable surface.

Further, the flow of air between the disc and the turntable surface combines with centrifugal forces to facilitate the removal of any matter that may be found between the disc 24 and the surface of the turntable 12. This is especially important in "contacting" systems where the presence of particulate matter could interfere with the head-disc relationship.

Thus there has been shown and described an improved rotating turntable for video discs that is adapted to supply a supporting cushion of air between the turntable and a relatively flexible or even "floppy" disc. A noncontacting transducer head assembly can be fixedly mounted adjacent the disc and by appropriate adjustment of the fluid pressure between the transducer head and the disc, the head-to-disc separation can be closely controlled. The shape of the turntable, will to a great extent, be determined by the weight and flexibility of the disc to be used. The turntable may include an annular shoulder inward of an annular groove as in the preferred embodiment, or the annular shoulder, itself may be provided with air passages.

The disc supporting surface may be conical, as shown in FIG. 6, or planar as shown in FIG. 3, depending upon the volume of fluid flow between the disc and the surface. Other shapes may be empirically determined keeping in mind that the fixed head will be operating in a predetermined path and that the primary consideration of the system is that a uniform spacing be maintained between the head and the deformations representing information on the disc whether they are found at the surface or beneath a protective surface coating.

Other embodiments and variations will appear to those skilled in the art without departing from the basic teachings of the present invention. Accordingly, the scope of the invention should be limited only by the claims appended hereto:

I claim:

1. A turntable adapted to support and rotate a flexible annular disc lying thereon and concentric with it, comprising:
    a rotatable disc support member having an outer portion surrounding an annular land portion having a planar surface raised above the surrounding surface of said outer portion for supporting the flexible annular disc, the flexible disc overlying said annulas land portion and at least one section of said outer portion, and
    conduit means including at least one aperture through said disc support member and located radially outwardly of said annular portion,
    whereby said support member, in rotation, draws fluid into the area between the disc support member and the flexible annular disc supported thereon.

2. The turntable of claim 1,
    wherein said outer portion of said disc support member has a conical surface, adapted to be adjacent the disc, with the outer peripheral edge being farther below the plane defined by said annular land portion than is the inner edge, adjacent the annular portion.

3. The turntable of claim 2, above, further including additional apertures in said conical surface radially outward from said annular portion.

4. The turntable of claim 1, wherein said annular portion is surrounded by a groove and said conduit means include apertures within said annular groove, said outer portion having a substantially planar surface.

5. The turntable of claim 4, above, wherein said groove is radially located inward of any area intended to carry information on the disc.

6. The turntable of claim 1, above, wherein said annular portion is a land having a planar surface raised above the surrounding surface of said outer portion of said disc support member and said conduit means further include a plurality of apertures extending through said support member to the opposite face thereof.

7. The turntable of claim 6, above, wherein said conduit means include at least one annular groove radially outward of said annular land portion, said groove including a plurality of apertures for transporting fluid to the area between the disc and said support member whereby a disc on the turntable in rotation, acquires a hydrodynamic fluid bearing supporting the disc away from the turntable surface.

8. A turntable adapted to support and rotate a thin flexible disc having a central aperture comprising:
    (a) spindle means adapted to receive the disc central aperture;
    (b) holding means mounted on said spindle for clamping the disc for rotation with said spindle means; and,
    (c) disc support means connected to and concentric with said spindle means, including an annular land portion surrounding said spindle means for supporting the central portion of the disc;
    said disc support means further including an outer portion adjacent said annular land portion extending radially outwardly from and non-coplanar with said annular land portion, whereby a disc clamped to said turntable overlies said annular land portion and some of said outer portion and is normally in surface contact with the turntable in the annular land portion only, and is spaced away from the remainder of said disc support means surface;
    and conduit means including at least one aperture through said disc support means for supplying fluid to the area between the disc support means and the flexible whereby said disc support means, in rotation, draws fluid into the area between the disc support means and the flexible disc.

9. The turntable of claim 8 above, further including an annular groove in said support means surface concentric with and adjacent to said annular land portion and including at least a fluid supply conduit to the opposite side of the turntable for transmitting fluid therethrough, whereby a flow of fluid is enabled through said conduit and radially outwardly between said disc support means surface and the disc, upon rotation of the turntable.

10. The turntable of claim 9 above, including additional fluid conduits arranged at radial locations different from said annular groove.

11. The turntable of claim 9 including a plurality of conduits in said annular groove for transmitting fluid therethrough.

* * * * *